US012669623B2

(12) United States Patent (10) Patent No.: US 12,669,623 B2
Koziol et al. (45) Date of Patent: Jun. 30, 2026

(54) CIRCUIT AND METHOD FOR X-RAY INDUCED VOLTAGE PULSE AMPLITUDE ESTIMATION IN PIXEL READOUT CHANNEL

(71) Applicant: Akademia Gorniczo-Hutnicza im. Stanislawa Staszica, Cracow (PL)

(72) Inventors: Anna Koziol, Cracow (PL); Piotr Maj, Cracow (PL); Robert Szczygiel, Cracow (PL); Piotr Otfinowski, Cracow (PL); Maciej Wielgosz, Cracow (PL); Krystian Strzalka, Bilgoraj (PL); Damian Kuznar, Korczyna (PL)

(73) Assignee: AKADEMIA GORNICZO-HUTNICZA IM. STANISLAWA STASZICA, Cracow (PL)

( * ) Notice: Subject to any disclaimer, the term of this patent is extended or adjusted under 35 U.S.C. 154(b) by 170 days.

(21) Appl. No.: 18/585,721

(22) Filed: Feb. 23, 2024

(65) Prior Publication Data

US 2025/0271582 A1    Aug. 28, 2025

(51) Int. Cl.
*G01T 1/24* (2006.01)
*G06F 1/14* (2006.01)
*G06N 3/04* (2023.01)

(52) U.S. Cl.
CPC ............... *G01T 1/247* (2013.01); *G06F 1/14* (2013.01); *G06N 3/04* (2013.01)

(58) Field of Classification Search
CPC .............. G01T 1/247; G06F 1/14; G06N 3/04
See application file for complete search history.

(56) References Cited

U.S. PATENT DOCUMENTS

| | | | |
|---|---|---|---|
| 8,866,094 B2 | 10/2014 | Tsukiyama et al. | |
| 11,448,778 B2 * | 9/2022 | Wang | G01T 1/17 |
| 2010/0246919 A1 * | 9/2010 | Wainer | G01T 1/17 |
| | | | 250/208.2 |
| 2019/0164037 A1 | 5/2019 | Kim et al. | |
| 2020/0408929 A1 * | 12/2020 | Wang | G01T 1/17 |
| 2022/0057534 A1 * | 2/2022 | Sundberg | A61B 6/5294 |
| 2022/0308242 A1 * | 9/2022 | Wang | G06N 3/094 |

OTHER PUBLICATIONS

Johnson, I. et al., "Eiger: a single-photon counting x-ray detector", Journal of Instrumentation, vol. 9, May 2014, pp. 10.

* cited by examiner

*Primary Examiner* — Hugh Maupin
(74) *Attorney, Agent, or Firm* — The Farrell Law Firm, P.C.

(57) ABSTRACT

A circuit for an X-ray-induced voltage pulse amplitude estimation inside a pixel readout channel, in a hybrid pixel array detector, an input of the circuit is connected to a pixel electrode, is provided. The circuit including a charge-sensitive amplifier (CSA) block configured to amplify a current pulse carried to its input from the pixel electrode and to convert it to a voltage pulse; an analog to digital converter (ADC) block connected to an output of the CSA block and configured to operate at a first clock frequency, and to sample an input voltage signal and output a result of the sampling as a codeword, wherein an artificial neural network (ANN) block is configured to operate at a second clock frequency, and to perform operations related to the neural network and estimate an amplitude of the voltage pulse, the ANN block in communication with the ADC block.

18 Claims, 7 Drawing Sheets

PRIOR ART

CIRCUIT AND METHOD FOR X-RAY INDUCED VOLTAGE PULSE AMPLITUDE ESTIMATION IN PIXEL READOUT CHANNEL

BACKGROUND

1. Field

The present disclosure relates generally to X-ray photon detection, and more particularly to a circuit and a method for the estimation of the amplitude of a pulse generated inside a pixel readout channel in a hybrid pixel array detector.

2. Description of Related Art

X-ray photon detection is one of the most popular measurement methods used in industry, science, health, and more. One of the types of devices used for spatial photon registration is a photon-counting hybrid pixel area detector (HPAD). The HPAD consists of two main components: a sensor material, e.g. Silicon (Si), Cadmium Telluride (CdTe), and an integrated circuit (IC) designed as a matrix of pixels, as presented in FIG. 1.

FIG. 1 is a diagram illustrating components of an HPAD.

Referring to FIG. 1, when the photon hits the sensor material, it induces the formation of a cloud of charge proportional to the photon energy. With the sensor bias voltage, the cloud of charge travels across the sensor and is attracted to the electrode of the pixel closest to the charge deposit area. At the input of the pixel, the cloud appears as a current pulse. Such a current pulse is then processed inside the pixel readout channel. In HPADs, it is changed to a voltage pulse in the pixel analog front-end for further processing.

One of the most desired pieces of information from an X-ray measurement is the time of a photon arrival and its energy at that time. Both of these pieces of information can be withdrawn from the amplitude of the generated voltage pulse.

Besides the configuration of the processing blocks of the pixel readout channel, many factors can influence the accuracy of the voltage pulse amplitude measurements. One factor is technology spread, which affects the spread of the gain between the pixels, as well as the spread of the signal DC offset level. A second factor is gain nonlinearity, which causes voltage pulse amplitude not to increase linearly to the increase in the photon energy. A third factor is the fluctuation of the DC level in time. Another factor is the noise of the pixel analog front-end. To successfully register a photon hit, and estimate the photon energy, it is crucial to propose a processing path that can abstract from these problems.

An implementation of a standard HPAD pixel readout channel is described in the article: R. Dinapoli et al., "EIGER: Next generation single photon counting detector for X-ray applications," *Nucl. Instruments Methods Phys. Res. Sect. A Accel. Spectrometers, Detect. Assoc. Equip.*, vol. 650, no. 1, pp. 79-83, 2011, doi: 10.1016/j.nima.2010.12.005, herein referred to as "Dinapoli".

In the method of Dinapoli, first, the current pulse that appears at the pixel input is amplified and changed to a voltage pulse in a PREAMP/SHAPER block. The amplitude of such a generated pulse is then compared to a THRESHOLD level in a DISCRIMINATOR block. When the voltage signal amplitude exceeds the THRESHOLD level, the DISCRIMINATOR block returns 1. Else, it returns 0.

The THRESHOLD level is an analog reference voltage. It is a global signal which means that the same value is delivered to every pixel in the matrix. To minimize the influence of DC offset dispersion spread between the pixels, a THRESHOLD TRIMBITS 6-bit register is used. Its value is local which means it is configured per pixel.

The output of the DISCRIMINATOR block is monitored by the COUNTER block. When the COUNTER detects a rising edge, it increments the value of its inner register by one.

Assuming that THRESHOLD level is set above the noise level, the circuit enables detecting a photon hit by a voltage signal amplitude comparison to the THRESHOLD level. Hence, information indicating whether the voltage signal amplitude exceeded the THRESHOLD level or not is obtained, and consequently, information indicating whether there was a pulse in a signal or not is also obtained.

Further, information indicating whether the voltage signal amplitude was higher than the THRESHOLD level, and consequently, whether the voltage pulse amplitude was at least equal to THRESHOLD level, assuming that the pulse was found in a signal at all, is obtained.

In the solution presented above, the reduction of the direct current (DC) level dispersion between the pixels is based on the TRIMMING blocks and THRESHOLD TRIMBITS values.

As artificial neural networks are flexible enough to be taught to deal with the previously mentioned problems, an alternative way to increase the accuracy of the measurements of the desired information is to introduce a programmable neural network inside the signal processing path. The architecture of the neural network can, however, play an important factor in its implementation by impacting the size of the fabricated IC. An example of a neural network architecture that can be designed to be small enough while still being capable of meeting the requirements is the multilayer perceptron (MLP) neural network.

SUMMARY

Embodiments of the present disclosure provide both a circuit and a method for the estimation of the amplitude of a pulse generated inside a pixel readout channel in a hybrid pixel array detector, for an X-ray photon energy detection.

According to an embodiment, a pixel readout channel includes a charge-sensitive amplifier (CSA) block that amplifies a current pulse carried to its input from the pixel electrode and converts it to a voltage pulse, an analog-to-digital converter (ADC) block that samples the input voltage signal and outputs the result of sampling as codewords, and an artificial neural network (ANN) block that performs operations related to the MLP neural network based on the successively received codewords, a neural network configuration, neural network weights values, and neural network biases values, and consequently estimates the amplitude of the voltage pulse.

According to an embodiment, the ADC block includes an output register configured to enable synchronization with the ANN block.

According to an embodiment, the ANN block includes a PAYLOAD_MEMORY memory, an INPUT_BUFFER register, a NEURAL NETWORK CALCULATOR (NNC) block., and a CONTROLLER block.

According to an embodiment, the PAYLOAD_MEMORY memory is configured to store the neural network configuration, the neural network weights values, and the neural network bias values.

According to an embodiment, the neural network configuration includes the number of neural network layers, the size of every neural network layer, the bit range of weights of each neural network layer, the bit range of biases of each neural network layer, the size of the INPUT_BUFFER register and the bit range of codewords.

According to an embodiment, the INPUT_BUFFER register is configured to receive the codeword from the ADC block, store it, and shift stored codewords to the NNC block.

According to an embodiment, the NNC block is configured to perform calculations related to an MLP neural network based on the codewords, the neural network weights values, and the neural network bias values.

According to an embodiment, the calculations related to the MLP neural network include one of matrix multiplications and executions of an activation function.

According to an embodiment, the CONTROLLER block is configured to control the execution of operations related to the neural network in the ANN block based on the neural network configuration.

According to an embodiment, an output buffer of the ANN block is configured to store the value of pulse amplitude estimation based on the result of the calculations returned by the ANN block after performing operations related to the neural network.

According to an embodiment, a method includes initializing an ANN block, using a CSA block to amplify a current pulse carried from the pixel electrode and convert it to a voltage pulse, using an ADC block to sample the voltage pulse and output the result of sampling as codewords, using the ANN block to perform operations related to the MLP neural network and to estimate the amplitude of the voltage pulse.

According to an embodiment, the method includes using the following modules of the ANN block to perform operations related to the MLP neural network: an INPUT_BUFFER register, a PAYLOAD memory, a CONTROLLER block, and an NNC block.

According to an embodiment, the initializing of the ANN block includes updating a PAYLOAD memory with the neural network configuration, the neural network layers biases values, and the neural network layers weights values.

According to an embodiment, the neural network configuration includes the number of neural network layers, the size of every neural network layer, the bit range of weights of each neural network layer, the bit range of biases of each neural network layer, the size of an INPUT_BUFFER register and the bit range of codewords.

According to an embodiment, the operations related to the MLP neural network include receiving the codewords from the ADC block and writing the codewords to the INPUT_BUFFER register, moving the codewords from the INPUT_BUFFER register to the NNC block, and using the NNC block to perform calculations related to the neural network.

According to an embodiment, the calculations related to the neural network include one of matrix multiplications based on the codewords, the neural network weights values, and the neural network bias values, and/or executions of the activation function.

According to an embodiment, the method includes using the CONTROLLER block to control the execution of operations related to the neural network based on the neural network configuration.

According to an embodiment, the result of the operations related to the neural network returned by the ANN block includes an estimation of the amplitude of the voltage pulse.

Accordingly, the present disclosure introduces a new enhanced quality to the operation of single photon counting HPAD X-ray detectors by more precisely measuring a photon energy value than existing solutions. In the presented solution, the estimation is done by an ANN block trained for increasing the resolution of the photon energy measurement above the resolution of a preceding ADC block. Having a high precision of photon energy measurement, the detector can be used for color X-ray imaging to, for example, build precise spectrometers.

BRIEF DESCRIPTION OF THE DRA WINGS

The above and other aspects, features, and advantages of certain embodiments of the present disclosure will be more apparent from the following description taken in conjunction with the accompanying drawings, in which.

DETAILED DESCRIPTION

Figure 1:
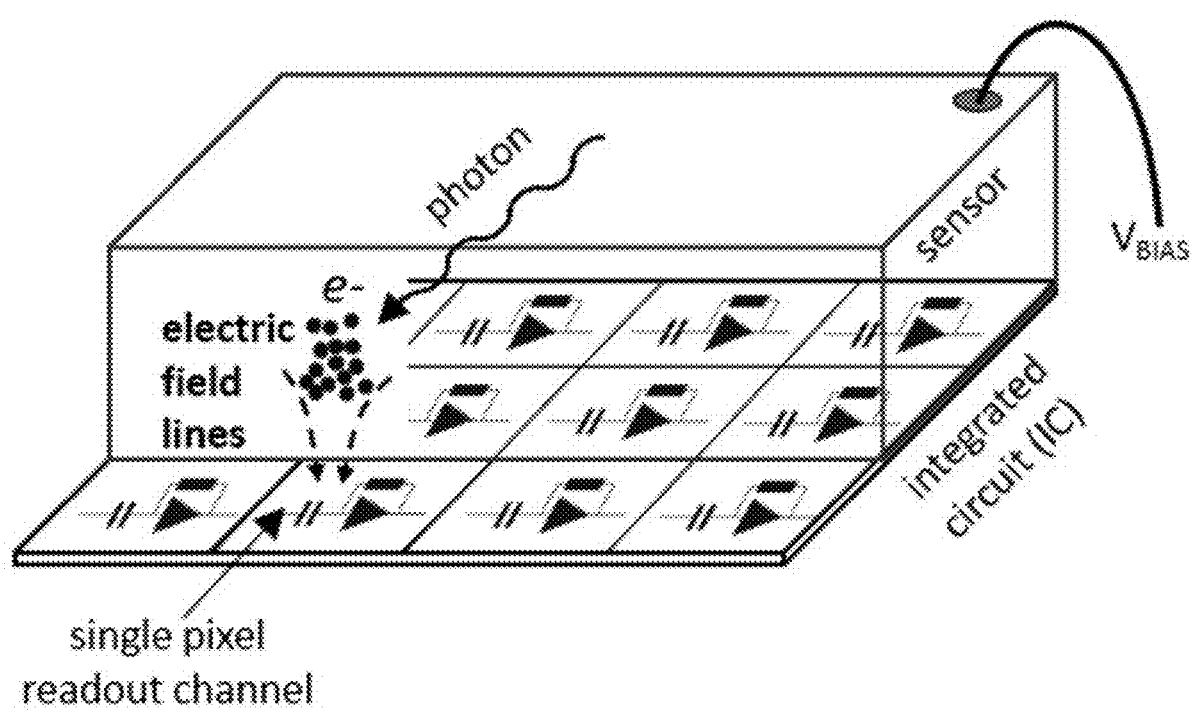
FIG. 1 is a diagram illustrating components of an HPAD.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Pattern recognition or classification based on an ANN may be possible based on the set of parameters calculated during the neural network training process, called the neural network weights values and the neural network biased values. The input to the training process is a set of input training data, as well as a pre-defined configuration of the neural network that includes the architecture of a neural network, the number of the neural network layers, and the sizes the neural network layers. When the neural network is implemented in hardware, additional parameters should be included in the neural network configuration, i.e. the bit range of weights of each neural network layer, the bit range of biases of each neural network layer, the size of a neural network input vector and the bit range of the input vector data.

The training process of the neural network can be implemented and executed either directly in hardware while being embedded in the neural network IC implementation, or a high-level personal computer (PC) application. The latter might enable further changes to the training process after the fabrication of the IC.

An example architecture of the ANN is an MLP neural network, according to the embodiment of the presented disclosure. The basic MLP neural network includes an input layer, one or more hidden layers, and an output layer. The input layer is the first layer of the neural network and it may be a single scalar value or a 1D vector of values. It may be fed with values that represent a processed signal, e.g. a sampled pulse signal. The output layer is the last layer of the neural network and it may be a single scalar value or a 1D vector of values. The output layer stores the result of the neural network calculation. The hidden layers are intermediate neural network layers and they may be a 1D or 2D matrix. The hidden layers store neural network weights.

The MLP neural network performs matrix multiplication. In the MLP, the matrix is sequentially multiplied by the output of the previous matrix multiplication. Consequently, the input layer values are multiplied by the first hidden layer values to generate a first product. The first generated product is multiplied by the second hidden layer values to generate a second product. The second generated product is then multiplied by the third hidden layer values, and so on, until the output layer. The last generated product is the output of the neural network.

For the sake of achieving better performance of the neural network calculation, other components may be included in the neural network architecture, such as a bias, separate for every hidden layer. The size of a bias could be a single scalar value or a 1D vector of values and equal to the size of the product after each hidden layer multiplication. The bias may enable an introduction of an unevenness or a balance to the result of the generated product.

The blocks used to implement matrix multiplication operation may be MAC hardware blocks. A single MAC block enables the multiplication of a single scalar value with a 1D vector or the multiplication of two 1D vectors, and a plurality of MAC blocks enables the multiplication of 1D vector and 2D matrix.

Accordingly, as used herein, the term "block" may denote functional elements within the circuit design. This term, "block," encompasses a broad spectrum of implementations, ranging from hardware components, such as discrete components, integrated circuits, microchips, or modules, to software entities, including sets of instructions, algorithms, or code, and even extends to hybrid forms that integrate both hardware and software aspects to fulfill its designated function.

In the hardware context, a "block" might refer to any physical entity, such as an IC that amplifies current pulses and converts them into voltage pulses in the case of a CSA block, or a microchip designed for sampling voltage signals and converting them into digital codewords as seen in an ADC block. These hardware blocks may be fabricated using semiconductor materials and technologies like complementary metal-oxide-semiconductor (CMOS) and/or bipolar junction transistor (BJT) technologies.

In addition, the solutions disclosed herein may be performed by a method involving the computation of various values executed on a computer system where a training algorithm is embodied in computer-executable instructions, stored within a memory that could be non-transitory. When these instructions are performed by the processor (or controller), a series of operations are executed that adjust certain values, such as the neural network's biases and weights in response to input training data, with the ultimate goal of optimizing the network's performance for a designated task.

The storage and accessibility of the neural network training algorithm, alongside the input training data, may be facilitated by non-transitory memory types. Non-transitory computer-readable memories, which are physical storage media, ensure the retention of data over extended periods, and includes hard disk drives (HDDs), solid state drives (SSDs), flash memory devices like universal serial bus (USB) flash drives and memory cards, read-only memory (ROM), and random access memory (RAM).

Figure 2:
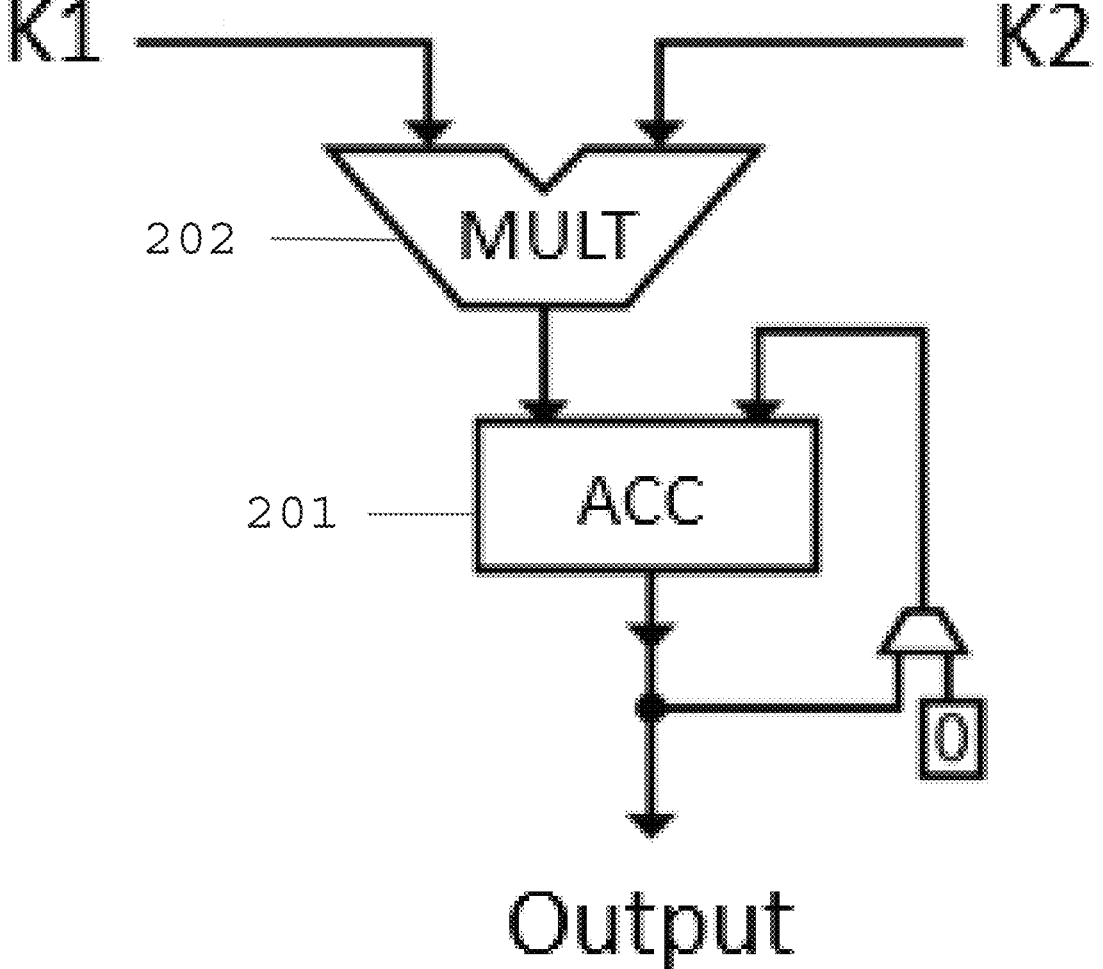
FIG. 2 illustrates a scheme of a single multiply and accumulate (MAC) block, according to an embodiment.

FIG. 2 illustrates a scheme of a single MAC block, according to an embodiment.

Referring to FIG. 2, the accumulator unit of a MAC block, marked in the figure as ACC corresponding to 201, is initialized at the beginning of matrix multiplication with zero. The MAC block may contain two inputs, K1 and K2. The K1 input may carry a single value from the input vector, such as a single value from the input layer or a single value from a previously calculated product, and the K2 input may carry the value of weight from the hidden layer. During an operation, the values from the K1 and K2 inputs are multiplied by the MULT unit (the term "unit" may be interchangeably used with the term "block"), corresponding to 202, and then stored in the ACC unit. During the whole process of multiplication, in the successive steps, consecutive values are taken from the input vector and are multiplied by consecutive weight values of the hidden layer, and such generated products are accumulated in the ACC unit. After the matrix multiplication is finished, the bias value can be added to the value stored in the ACC unit, and the result of the MAC block operation can be returned.

Another component that may be added to the MLP neural network architecture may be an activation function implemented between hidden layers. An example of the activation function is the ReLU function.

Figure 3:
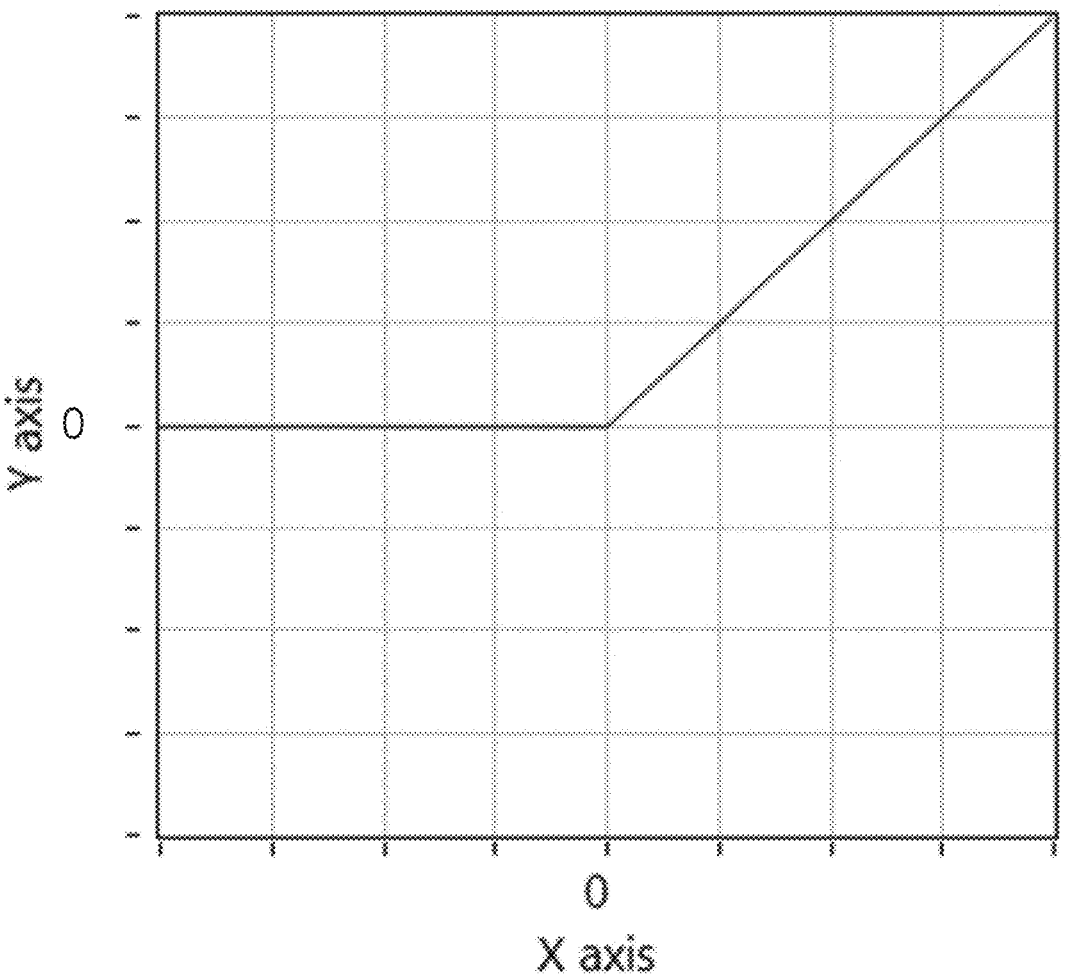
FIG. 3 illustrates a rectified linear unit (ReLU) activation function, according to an embodiment.

FIG. 3 illustrates an ReLU activation function, according to an embodiment.

Referring to FIG. 3, for negative input values on the X axis, the output of the ReLU function on the Y axis is equal to zero. For the positive input values on the X axis, the output of the ReLU function on the Y axis is the same as the input. For an input of zero, the output of the ReLU function is equal to zero.

Another block that may be added to the MLP neural network execution process is a SHIFT block. The SHIFT block shifts the input value a pre-defined number of bits and consequently, it outputs a reduced number. This functionality may enable determining the data bit range between multiplications of consecutive neural network layers. As an example, if the hidden layer weights values are configured to a 12 bits range, and the input vector values are configured to a 12 bits range, and the ACC of a used MAC block is configured to a 24 bits range, then the SHIFT block may be used to reduce the bit range of MAC block calculation result from 24 bits to 12 bits.

Figure 4:
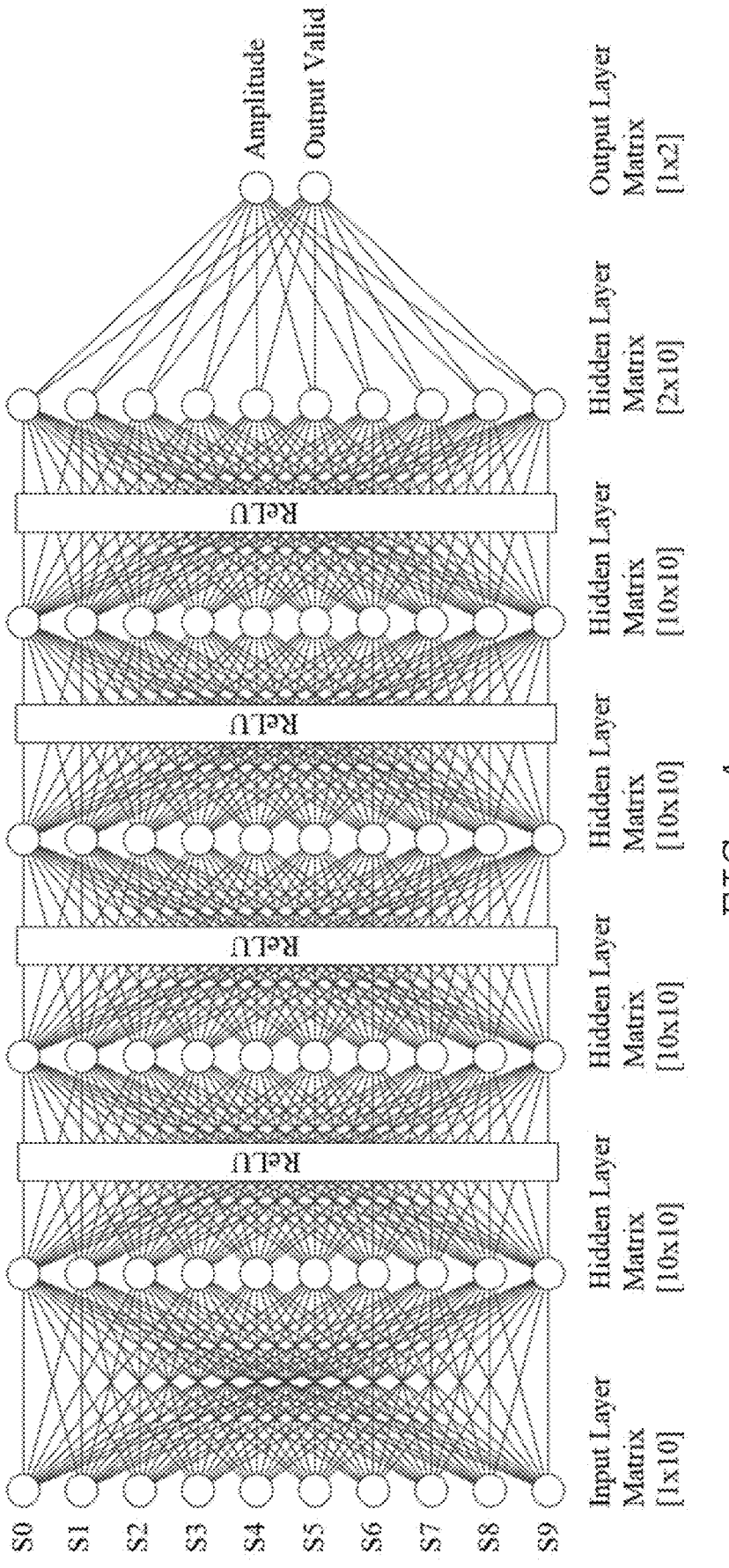
FIG. 4 illustrates an architecture of an MLP neural network with a possible ReLU activation function to be configured and executed in an ANN block, according to an embodiment.

FIG. 4 illustrates an architecture of an MLP neural network with a possible ReLU activation function to be configured and executed in an ANN block, according to an embodiment.

Referring to FIG. 4, the MLP neural network is presented that includes an input layer, a total of 5 hidden layers, and an output layer. The input layer is a 1D vector that consists of 10 pieces of input data. The first, second, third, and fourth hidden layers are each a 2D matrix that includes 10×10 neural network weights values. The fifth hidden layer is a 2D matrix comprising 2×10 neural network weights values. The output layer is a 1D matrix of 2 values calculated and output by the neural network. The first, second, third, and fourth hidden layers contain bias vectors, each 1D vector of 10 data. The fifth hidden layer contains a 1D bias vector of 2 elements. After the first, second, third, and fourth hidden layers, the ReLU activation function is implemented and executed on the products.

Figure 5:
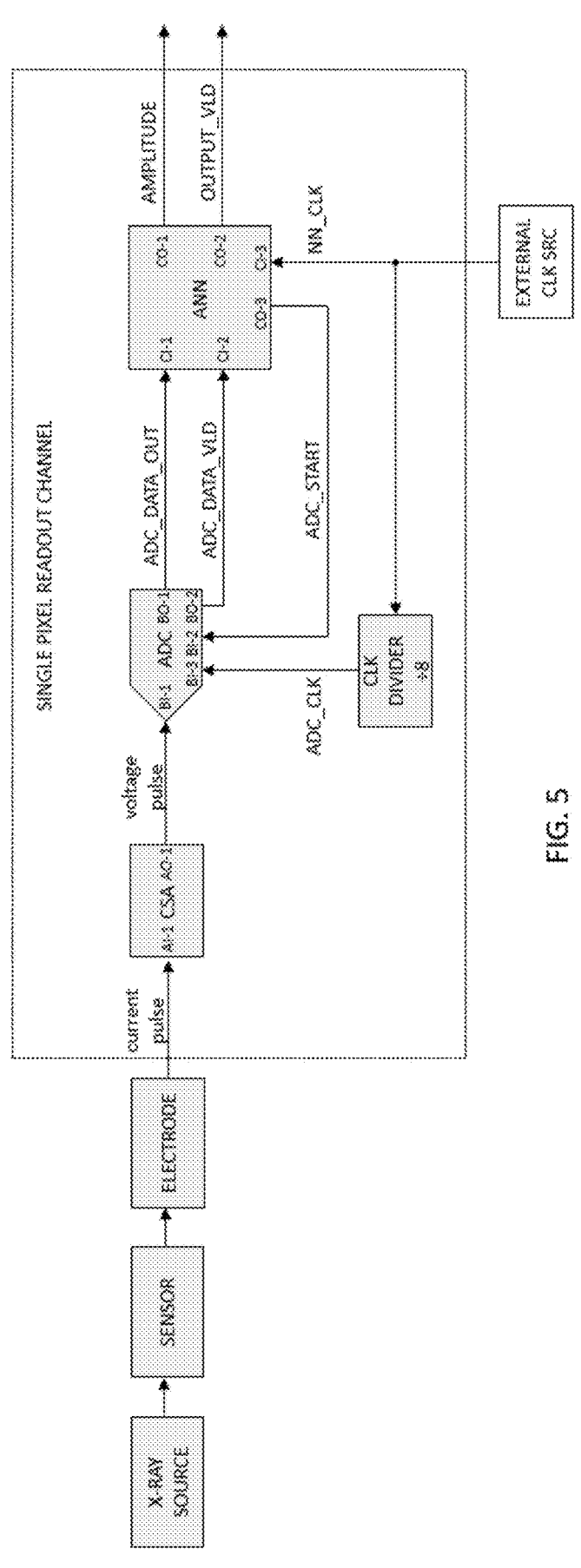
FIG. 5 is a top-view single pixel readout channel architecture and its input source, according to an embodiment.

FIG. 5 is a top-view single pixel readout channel architecture and its input source, according to an embodiment.

Referring to FIG. 5, a conceptual design illustrating an input signal source and an implementation of a single pixel readout channel is presented. The input to the readout channel is a current pulse from a pixel electrode. The first block in the single pixel readout channel that may read the current pulse is an AI-1 input of a CSA block. The CSA block amplifies the current pulse and converts it to a voltage pulse. The output of the CSA block, an AO-1, may be connected to a BI-1 input of the ADC block. The ADC block samples the input voltage signal at the BI-1 input and may output the result of sampling as a codeword to a BO-1 output, named ADC_DATA_OUT, connected to a CI-1 input of an ANN block. When the ADC calculates a new codeword value, it may be configured to return a high state signal to a BO-2 output, called ADC_DATA_VLD, connected to a CI-2 input of the ANN block. The ADC block may work in synchronization with the ANN block. The synchronization may be enabled via an ADC_START signal carried to a BI-2 input of the ADC block from a CO-3 output of the ANN block. The ADC block may operate under an ADC_CLK clock received on a BI-3 input. The ANN block may return an estimated amplitude of the voltage pulse to a CO-1 output, called an AMPLITUDE, and the signal informing about valid output to a CO-2 output called an OUTPUT_VLD. The ANN block may operate under an NN_CLK clock that may be carried to a CI-3 input from an EXTERNAL CLK SOURCE. The ADC_CLK frequency may be the clock derived from the EXTERNAL CLK SOURCE via a CLK DIVIDER block. As an example, the ADC resolution might be 5 bits, 6 bits, or 7 bits, and the ADC_CLK may be 8 times slower than the NN_CLK clock.

Figure 6:
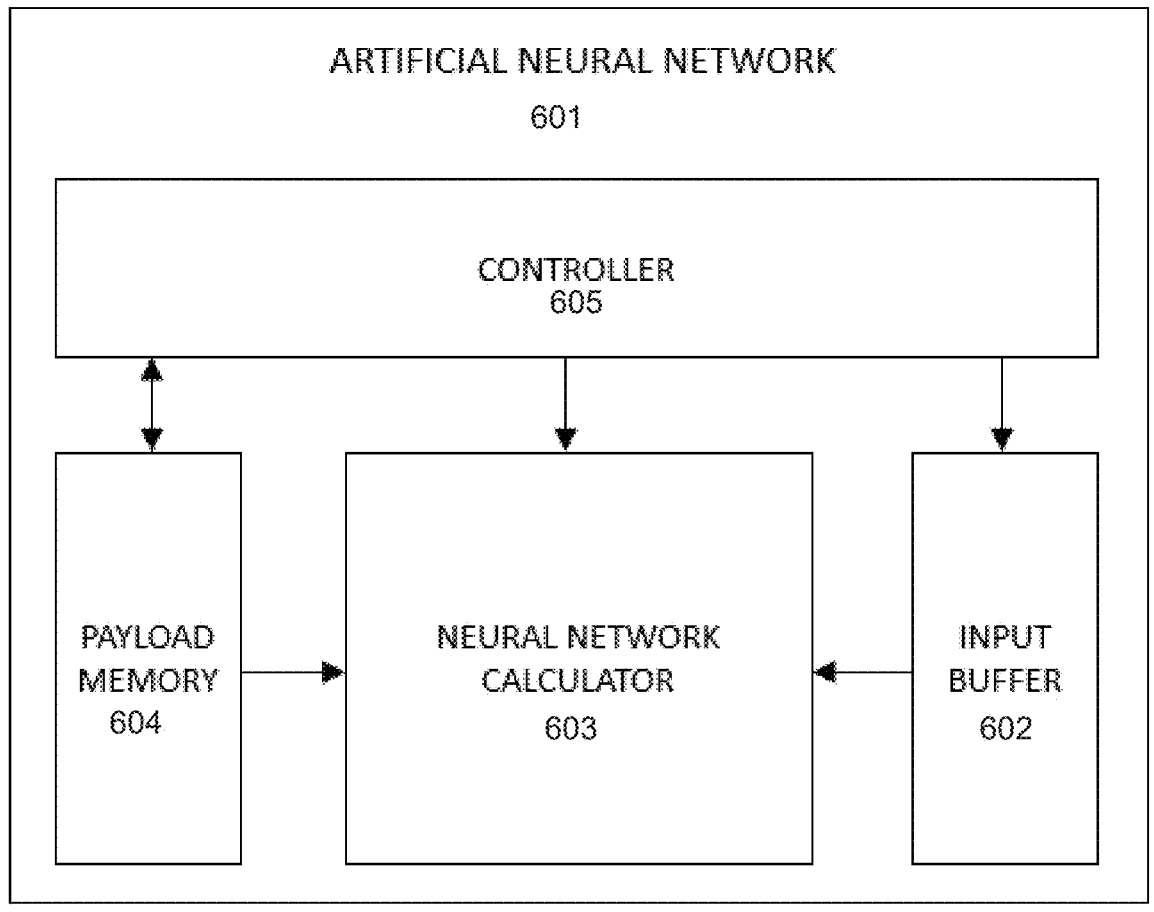
FIG. 6 illustrates components of an ANN block, according to an embodiment.

FIG. 6 illustrates components of an ANN block, according to an embodiment.

Referring to FIG. 6, the input of the ANN block, corresponding to 601, is an INPUT_BUFFER register, corresponding to 602, that stores codewords. The output of the INPUT_BUFFER register may be connected to an input of a NNC block, corresponding to 603. The NNC block may execute all operations related to the neural network calculations, such as matrix multiplications or ReLU activation function execution. The input data to the NNC block may be codewords from the INPUT_BUFFER register as well as neural network weights and neural network values biases values read from a PAYLOAD memory corresponding to 604. The operation of the calculations inside the NNC block may be controlled by a CONTROLLER block corresponding to 605. The CONTROLLER block may be implemented as a finite state machine operating under a set of instructions read from the PAYLOAD memory.

Figure 7:
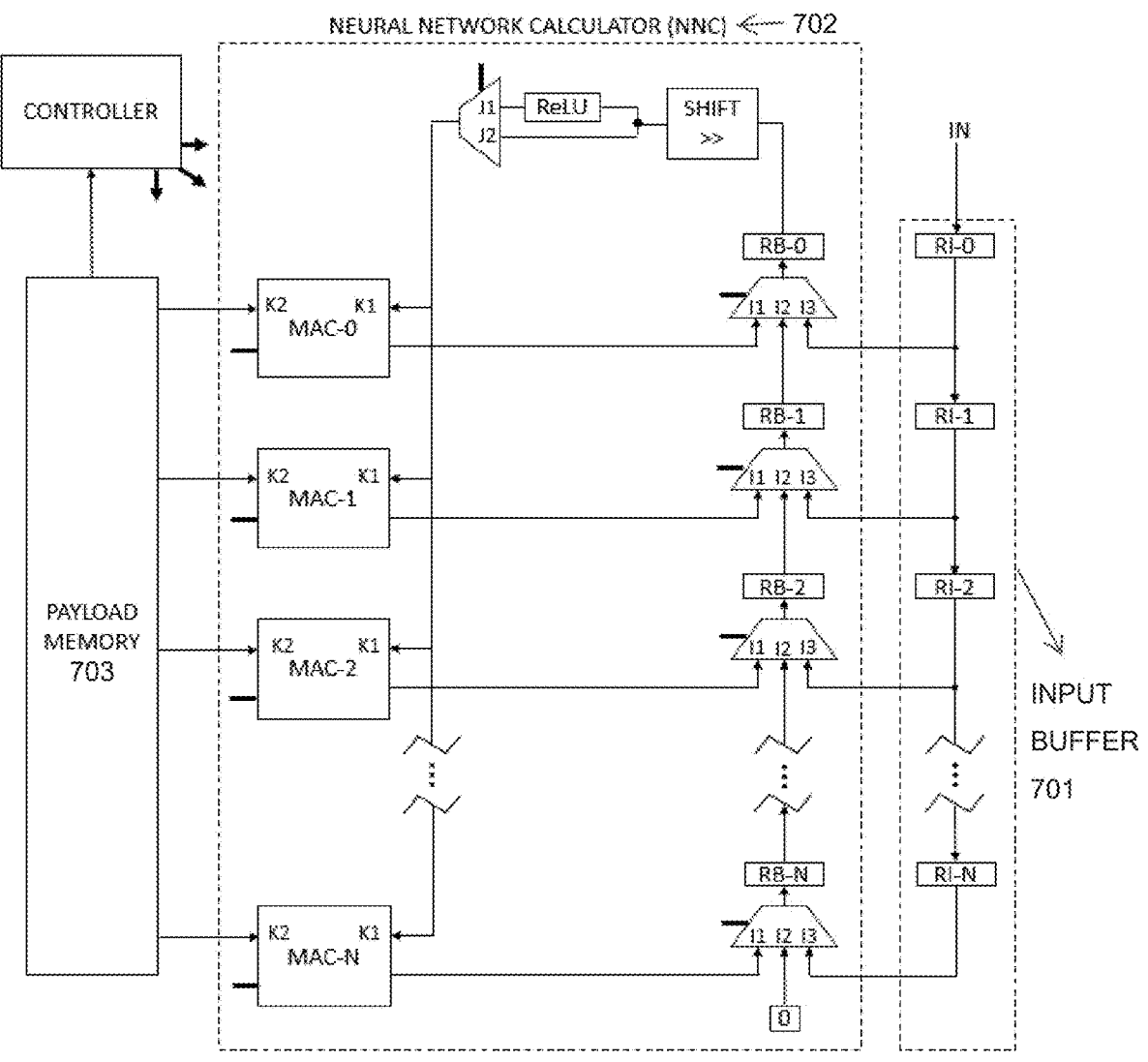
FIG. 7 illustrates connections between components of an ANN block, according to an embodiment.

FIG. 7 illustrates connections between components of an ANN block, according to an embodiment.

Referring to FIG. 7, the INPUT_BUFFER register, corresponding to 701, may be designed as a shift register. The NNC block, corresponding to 702, may include a set of register "B" input multiplexer RB_SELECTOR blocks, a set of RB registers, the SHIFT block, an ACTIVE_SELECTOR block, the ReLU block, and a set of the MAC blocks. The number of the RB registers, the RB_SELECTOR blocks, and the MAC blocks should be equal to the size of the INPUT_BUFFER register.

The RB_SELECTOR blocks may be configured to receive the codewords from the INPUT_BUFFER register at the beginning of the operations related to the neural network to its I3 inputs, in such a way that the codeword stored in the RI-N register of the INPUT_BUFFER register may be copied to the I3 input of the corresponding RB_SELECTOR, where the N value is an index of the RI register (RI-0 to RI-N). The RB_SELECTOR may then copy the value from the I3 input to the corresponding RB-N register. The RB registers together with their RB_SELECTOR blocks may be configured to collectively shape a single shift register and to shift data from the bottom RB register (e.g., RB-N) to the top RB register (e.g., RB-0) during a single neural network output calculation.

The SHIFT block may be configured to receive data from the top RB register and decrease the data bit range.

The ReLU block may be configured to receive the data from the SHIFT block and perform an ReLU operation on the data.

The ACTIVE_SELECTOR may work as a multiplexer and be configured to receive data from the ReLU block to its J1 input, and receive data from the SHIFT block to its J2 input, and output one of the two based on the neural network configuration.

The MAC blocks (MAC-0 to MAC-N) may be configured to receive a neural network bias value at the initialization of the operations related to the single neural network output calculation. The MAC blocks may also be configured to receive the data from the ACTIVE_SELECTOR to the K1 input, and the neural network weight value from the PAYLOAD memory 703 to a K2 input, and perform a multiply and accumulate operation. The MAC blocks are configured to receive successive data from the ACTIVE_SELECTOR block and neural network weights from PAYLOAD memory and perform the number of MAC operations until the single neural network layer output is calculated. During this operation, the RB registers and RB_SELECTOR blocks are configured to consecutively shift the data stored in RB registers from the bottom RB register to the top RB register, and consecutively transfer it to the K1 inputs of the MAC blocks via the ACTIVE_SELECTOR.

As an example, the bit range of weights of each neural network layer may be equal to 12, the bit range of biases of each neural network layer may be equal to 12, the size of an INPUT_BUFFER register might be equal to 10, and the bit range of codewords might be equal to 6.

During neural network operations, the RB_SELECTOR blocks may work as multiplexers and may be configured to receive data from the MAC blocks outputs to I1 inputs after the single neural network output calculation is finished, the data from the INPUT_BUFFER register, or data from the preceding RB register to I2 input, based on the neural network configuration, to perform consecutive multiplications using neural network layers.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A circuit for X-ray-induced voltage pulse amplitude estimation inside a pixel readout channel, in a hybrid pixel array detector, an input of the circuit is connected to a pixel electrode, the circuit comprising:

a charge-sensitive amplifier (CSA) block configured to amplify a current pulse carried to its input from the pixel electrode and to convert it to a voltage pulse; and an analog to digital converter (ADC) block connected to an output of the CSA block and configured to operate at a first clock frequency, and to sample an input voltage signal and output a result of the sampling as a codeword, wherein an artificial neural network (ANN) block is configured to operate at a second clock frequency, and to perform operations related to the neural network and estimate an amplitude of the voltage pulse, the ANN block in communication with the ADC block, and wherein the circuit is configured to generate, based on the estimated amplitude, a pixel output value for the pixel readout channel for use in forming an X-ray image and to output or store the pixel output value.

2. The circuit of claim 1, wherein the second clock speed is faster than the first clock speed by a predefined number of times.

3. The circuit of claim 1, wherein the ANN block comprises an INPUT_BUFFER register which is the input register of the ANN block, and wherein the INPUT BUFFER register stores a last number of N codewords.

4. The circuit of claim 1, wherein the ANN block comprises a PAYLOAD memory to store the configuration of the neural network and the values of weights and biases.

5. The circuit of claim 4, wherein the configuration of the neural network includes a number of neural network layers, a size of every neural network layer, a bit range of weights of every neural network layer, a bit range of biases of every neural network layer, and a bit range of codewords.

6. The circuit of claim 1, wherein the ANN block comprises a CONTROLLER block to control the operations of the neural network based on the configuration of the neural network stored in PAYLOAD memory.

7. The circuit of claim 1, wherein the ANN block comprises a neural network calculator (NNC) block to perform calculations related to the neural network.

8. The circuit of claim 7, wherein the NNC block comprises a rectified linear unit (ReLU) block to perform an ReLU operation.

9. The circuit of claim 8, wherein the NNC block comprises an ACTIVE SELECTOR block to enable selection between a value processed by the ReLU block and a value not processed by the ReLU block, and wherein the ACTIVE SELECTOR block's first input is connected to an output of the ReLU block and the ACTIVE SELECTOR block's second input is connected to an output of the top RB register.

10. The circuit of claim 7, wherein neural network operations in the NNC block include one of matrix multiplications, dot products, or ReLU operation.

11. The circuit of claim 7, wherein the NNC block comprises register block (RB) registers.

12. The circuit of claim 7, wherein the NNC block comprises multiply and accumulate (MAC) blocks to perform multiplication operations and accumulate the resulting product, thereby supporting matrix multiplication operations, wherein a number of the MAC blocks is equal to N, and wherein the MAC blocks first inputs are connected to an output of an ACTIVE SELECTOR block and the MAC blocks second inputs are connected to the outputs of a PAYLOAD memory block.

13. The circuit of claim 12, wherein the second inputs are configured to carry values of weights.

14. The circuit of claim 12, wherein the MAC units are configured to receive values of bias from the PAYLOAD memory block.

15. The circuit of claim 7, wherein the NNC block comprises RB SELECTOR blocks behaving as multiplexers, wherein the RB SELECTOR blocks first inputs are connected to outputs of the INPUT BUFFER register; the RB SELECTOR blocks second inputs are connected to outputs of preceding RB registers; and RB_SELECTOR blocks third inputs are connected to outputs of corresponding MAC blocks, and wherein outputs of the RB SELECTOR blocks are connected to inputs of a corresponding RB register.

16. A method for an X-ray-induced voltage pulse amplitude estimation inside a single pixel readout channel, in a hybrid pixel array detector, wherein the method comprises:

initializing a PAYLOAD memory with neural network layers bias values, neural network layers weight values, and a neural network configuration;

initializing a CONTROLLER block with the neural network configuration stored in the PAYLOAD memory; and processing the X-ray-induced voltage pulse in the single pixel readout channel, wherein the processing includes:

using a charge sensitive amplifier (CSA) block to amplify a current pulse carried to its input from the pixel electrode and to convert it to the X-ray-induced voltage pulse;

using an analog to digital converter (ADC) block to sample the X-ray-induced voltage pulse from the CSA block and output the result of sampling as a codeword; and using an artificial neural network (ANN) block to perform operations related to a neural network to estimate the amplitude of the X-ray-induced voltage pulse, wherein the operations related to the neural network include:

receiving the codeword from the ADC block and writing the codeword to an input buffer;

moving the codeword from the input buffer to register block (RB) registers of a neural network calculator (NNC) block such that a single codeword from the input buffer is written to a single RB register, wherein a number of RB registers is equal to a number of codewords in the input buffer; and using the NNC block to perform calculations related to the neural network, wherein the calculations related to the neural network include:

initializing multiply and accumulate (MAC) blocks by reading bias values from the PAYLOAD memory and writing the bias values to the MAC blocks, wherein a number of the MAC blocks is equal to the number of codewords in the input buffer; and performing a matrix multiplication operation, wherein the matrix multiplication operation is performed for codewords from consecutive RB registers until finished, and includes:

copying the codeword from the consecutive RB registers from a top RB register to first inputs of all the MAC blocks;

copying weights from the PAYLOAD memory to second inputs of all the MAC blocks;

performing MAC operations using the MAC blocks;

copying values stored in the MAC blocks to RB registers such that a single value from a single MAC block is written to a corresponding RB register;

performing a rectified linear unit (ReLU) operation on all values stored in RB registers by a ReLU block;

repeating calculations until the whole neural network is calculated;

reading out values stored in the RB registers;

using the estimated amplitude to produce a pixel output value; and storing or outputting the pixel output value for forming an X-ray image.

17. The method of claim 16, wherein the neural network layers bias values and weights values are computed by a neural network training algorithm implemented on a computer based on an input training data.

18. The method of claim 16, wherein the neural network configuration comprises a number of neural network layers, a size of every neural network layer, a bit range of weights of every neural network layer, a bit range of biases of every neural network layer, and a bit range of codewords.

\* \* \* \* \*